US006290769B1

(12) United States Patent
Carkner

(10) Patent No.: US 6,290,769 B1
(45) Date of Patent: Sep. 18, 2001

(54) LIGHTWEIGHT INSULATING CONCRETE AND METHOD FOR USING SAME

(75) Inventor: Philip M. Carkner, Southlake, TX (US)

(73) Assignee: Siplast, Inc.

( * ) Notice: Subject to any disclaimer, the term of this patent is extended or adjusted under 35 U.S.C. 154(b) by 0 days.

(21) Appl. No.: 09/338,252

(22) Filed: Jun. 22, 1999

(51) Int. Cl.⁷ .................................................. C04B 38/08
(52) U.S. Cl. ..................... 106/675; 106/672; 106/677; 106/678; 106/679; 106/680; 106/681
(58) Field of Search .................... 106/672, 675, 106/679, 680, 681, 677, 678

(56) References Cited

U.S. PATENT DOCUMENTS

| | | | |
|---|---|---|---|
| 3,372,040 | 3/1968 | Ware | 106/18.11 |
| 3,502,490 | 3/1970 | Ware | 524/5 |
| 3,563,774 | * 2/1971 | Charles | 501/108 |
| 3,795,653 | 3/1974 | Aignesberger et al. | 523/208 |
| 3,847,633 | 11/1974 | Race | 106/675 |
| 3,884,009 | 5/1975 | Frohlich et al. | 52/745.06 |
| 3,989,534 | 11/1976 | Plunguian et al. | 106/646 |
| 4,109,032 | 8/1978 | Barrall | 427/255 |
| 4,126,470 | 11/1978 | Braun et al. | 524/6 |
| 4,131,480 | 12/1978 | McCurrich et al. | 106/674 |
| 4,148,660 | * 4/1979 | Lankard et al. | 106/38.3 |
| 4,159,302 | 6/1979 | Greve et al. | 264/333 |
| 4,293,341 | 10/1981 | Dudley et al. | 106/675 |
| 4,518,431 | 5/1985 | Duvier | 106/DIG. 1 |
| 4,693,924 | 9/1987 | Kuper et al. | 428/170 |
| 4,868,039 | 9/1989 | Lehan | 428/241 |
| 5,053,282 | 10/1991 | Delvaux et al. | 428/323 |
| 5,108,679 | 4/1992 | Rirsch et al. | 264/118 |
| 5,114,617 | 5/1992 | Smetana et al. | 252/378 P |
| 5,290,355 | 3/1994 | Jakel | 106/675 |
| 5,542,358 | 8/1996 | Breslauer | 106/698 |
| 5,718,758 | 2/1998 | Breslauer | 106/698 |
| 5,795,380 | 8/1998 | Billings et al. | 106/675 |
| 5,873,936 | 2/1999 | Ogden | 106/715 |
| 5,888,292 | 3/1999 | Tremblay | 106/691 |

FOREIGN PATENT DOCUMENTS

| | | |
|---|---|---|
| 1062830 | 9/1979 | (CA) . |
| 1049184 | 11/1966 | (GB) . |
| 2127007 | 4/1984 | (GB) . |
| 2273095 | 8/1994 | (GB) . |
| 52-140532 | 11/1977 | (JP) . |
| 56-69289 | * 6/1981 | (JP) . |
| 06146526 | 5/1994 | (JP) . |
| 08312051 | 11/1996 | (JP) . |
| 09071449 | 3/1997 | (JP) . |

OTHER PUBLICATIONS

Derwent Abstract No. 1968–01–65Q, abstract of Great Britain Patent Specification No. 1105623 (Jan. 1968).
Brochure entitled " Siplast Roof Insulation NVS® PRE-MIX" (no date).
Brochure entitled "United States Gypsum: Poured gypsum concrete for economical, high–performance roof decks," (Nov. 1983).
Brochure entitled "Best New Products of 1998: Henry® Pondpatch,"(1998) (No Month).
Material Safety Data Sheet regarding NVS® Concrete Aggregate (Revised Apr. 1998).
The American Society for Testing and Materials Designation: C 332–87 (Reapproved 1991) entitled "Standard Specification for Lightweight Aggregates for Insulating Concrete." (1991) [No Month].
The American Society for Testing and Materials Designation: C 495–91a entitled "Standard Test Method for Compressive Strength of Lightweight Insulating Concrete." (1991) [No Month].
Brochure entitled "Siplast Roof Insulation The NVS® System" [No Date].
Material Safety Data Sheet: Pyrofill® Gypsum Concrete (Mar. 8, 1996).
Material Safety Data Sheet: Thermofill® Gypsum Concrete (Mar. 8, 1996).
Material Safety Data Sheet: Structo–Lite® Pre–Mixed Perlited Gypsum Plaster (Apr. 19, 1996).
Product Data Sheet entitled "Building Chemistry and Construction Applications: Ciment Fondu Lafarge." (Jun. 1998).

* cited by examiner

Primary Examiner—Anthony Green

(57) ABSTRACT

A lightweight insulating concrete composition includes a cementitious forming material and a lightweight aggregate combination of expanded vermiculite and expanded perlite, the weight ratio of one to the other not exceeding about 2:1. Preferably, the composition is about 4 parts by weight cementitious forming material and about 1 part by weight lightweight aggregate. The cementitious forming material may be a hydraulic binder and accelerator combination, and may be Portland cement, plaster of Paris, and terra alba, in a weight ratio of about 5:4:1, or calcium aluminate cement, and plaster of Paris, in a weight ratio of about 11:5. The composition may further include an air entraining admixture in an amount between about 0.5 and about 2.0 percent of the total weight of the mixture, where neutralized vinsol resin and alpha olefin sulfonate are acceptable, and a surfactant in an amount between about 0.3 and about 1.5 percent of the total weight of the mixture, where sulfonated melamine and napthalene formaldehyde are acceptable. A method of making the lightweight insulating concrete composition includes blending the cementitious forming material and the combination of lightweight aggregate of expanded vermiculite and expanded perlite, and any admixture or surfactant that may be included. A method of repairing or patching concrete surfaces using the lightweight insulating concrete, includes hydrating the composition, applying the concrete slurry and permitting it to cure for about 2 to about 4 hours until it sets.

30 Claims, No Drawings

LIGHTWEIGHT INSULATING CONCRETE AND METHOD FOR USING SAME

FIELD OF THE INVENTION

The present invention relates to lightweight insulating concrete (LWIC) and more particularly to those concretes which can be used to patch or otherwise repair LWIC, such as roof deck surfaces.

BACKGROUND OF THE INVENTION

Lightweight insulating concretes are known to be used as materials for roof deck surfaces, often in combination with a waterproof membrane covering secured with base ply fasteners. Concrete materials used for this purpose should be lightweight and relatively low density, in order to reduce the weight load applied to the existing building structure and to aid in insulating the building. LWIC may be used to fill in depressions in existing lightweight concrete roof deck surfaces and thereby correct water drainage characteristics that are undesirable; to repair joints in roof deck surfaces; or to repair other damage to the concrete roof deck, including cracks and holes left in the LWIC surface from removal of fasteners during replacement of the waterproofing membrane. Weight may also be a particular concern if the concrete roofing material is to be placed above an existing layer of concrete as a method of roofing repair.

Lightweight insulating concrete used for repairing patches, cracks, or the like, or when used as a material for re-roofing a concrete roof, should have several desirable characteristics. It should be relatively light weight, or low density, compared to structural concrete. It should be resistant to water intrusions from leaks in or around the waterproof membrane. It should exhibit low shrinkage of the applied layer in the vertical direction when applied and allowed to harden. It should have the ability to be "featheredged" to a zero, or near-zero, thickness to blend that layer's edge with the existing LWIC layer. In addition, an important characteristic is the length of time the material will require to set before it will bear foot traffic and accept and hold base ply or other fasteners. It should also be sufficiently strong to effectively retain fasteners placed therein, yet not so strong early after application as to prevent such placement of fasteners.

It is known to repair joints, cracks and depressions by filling the desired area. A known material for doing so include wood fiber-reinforced gypsum plaster, combinations of Portland cement and lightweight aggregate, and a slurry of Portland cement and water. Combinations of Portland cement and lightweight aggregate may also be used for other repairs, such as to re-roof by placing a new layer above an existing substrate layer.

However, these materials have many disadvantages. Gypsum tends to set very quickly (within a few minutes) and is therefore difficult to screed and feather edge. Also, gypsum mixtures are resistant to insertion of fasteners and prone to softening upor exposure to water. They also exhibit significant shrinkage in the vertical direction. Portland cement and lightweight aggregate mixtures have a very long set time, and typically the re-roofing process cannot proceed through placement of the waterproof membrane for at least 24 to 72 hours. This creates a significant disadvantage in that, particularly if the building is currently occupied, there is no waterproof roofing material applied to the roof for this period of time, which can result in damage in case of rain. A further disadvantage of aggregate/Portland cement mixtures is that they cannot be reliably feather edged to a zero, or near-zero, thickness because the resultant surface is rough and the bond to the existing LWIC is erratic and unpredictable.

Slurries of Portland cement and water also have a long set time, and thus have the same disadvantages as the aggregate/Portland cement mixtures. These slurries also exhibit excessive curing and drying shrinkage, and erratic and unpredictable bond strength to the lightweight insulating concrete substrate to which they are applied. The shrinkage exhibited by Portland cement slurries and gypsum mixtures is undesirable because it can result in the material pulling away from structures projecting vertically from the concrete roof deck surface, and it also may undesirably affect the slope-to-drain conditions created by original application of the material.

Various formulations for lightweight insulating concretes are known. U.S. Pat. No. 4,293,341 to Dudley et al. discloses a LWIC containing lightweight aggregate, Portland cement, an air entraining agent, a dispersing agent and preferably an inert densifying particulate. Dudley et al. teaches use of either vermiculite, or less desirably, perlite, but does not disclose any particular combination thereof. U.S. Pat. No. 4,293,341 to Dudley et al. is incorporated herein in its entirety for all purposes. Dudley et al. also discloses the use of air entraining agents and polyelectrolytic sulfonate dispersing agents to improve the characteristics of the concrete. Dudley et al. does not disclose specific set times, or early compressive strengths of the finished concrete.

U.S. Pat. No. 3,795,653 to Aignesberger et al. discloses lightweight concrete containing lightweight filler particles that are coated with melamine formaldehyde condensation product containing sulfonic acid groups and thereafter mixed with cement. Aignesberger et al. discloses that expanded clay, polystyrene, perlite, vermiculite, pumice, slag, or the like may be used alone or in combination as filler particles, but does not disclose any specific combinations or ratios.

U.S. Pat. No. 3,989,534 to Plunguian et al. discloses a cellular composition useful for fire resistance, soundproofing and thermal insulation that is formed from a (1) mineral cement, such as gypsum cement, Portland cement, calcium aluminate cement or magnesia cement, (2) a film former, such as guar gum or bentonite, (3) a mixture of ionic and non-ionic surfactants, and (4) a lightweight aggregate such as perlite, vermiculite or hollow silicate spheres, and (5) air substantially in excess of that used in air entrainment of cement. Plunguian et al. does not disclose combinations of perlite and vermiculite.

Apart from LWICs, U.S. Pat. Nos. 5,542,538 and 5,718,758 to Breslauer disclose a premixed ultra-light mortar for use with clay and concrete tiles using ASTM C-332 aggregate such as vermiculite or perlite in place of sand, with a mortar cement made from portland cement, lime, air entraining agents and water repelling agents. Breslauer does not disclose combinations of perlite and vermiculite. U.S. Pat. Nos. 5,542,538 and 5,718,758 to Breslauer are incorporated herein in their entirety for all purposes. Breslauer does not disclose specific set times, or early compressive strengths of the finished concrete.

U.S. Pat. No. 4,159,302 to Greve et al. discloses a material for a fire door core, comprising 50–70 weight percent expanded perlite, and as minor ingredients, an organic binder to achieve desired flexural and compressive strength, set gypsums and set hydraulic cement, which may include unexpanded vermiculite, clay, and fibrous reinforcements. The material is compression-molded and finished into a fire door core.

U.S. Pat. Nos. 3,372,040 and 3,502,490 to Ware disclose fire- and heat-resistant cementitious plaster compositions including a naturally-occurring phosphate rock and shale containing $P_2O_5$, and 0–50 weight percent exfoliated perlite or vermiculite or mixtures thereof. Ware does not disclose specific combinations or ratios of perlite to vermiculite, nor does Ware disclose the strength or density of the material, or set times.

None of the prior art formulations has all of the characteristics desired by the roofing industry for a lightweight insulating concrete having light weight, high strength, relatively short set times, water resistance, low shrinkage and the ability to be feather-edged.

BRIEF SUMMARY OF THE INVENTION

The object of the present invention is to provide an improved lightweight insulating concrete composition which may be used for patching, repairing joints and cracks, dressing-up surfaces, or filling in depressions, or correcting slope-to-drain conditions. A further object is to provide methods for using composition for patching, filling, repairing joints and cracks, dressing-up surfaces, filling in depressions, or correcting slope-to-drain conditions.

Accordingly the invention comprises a cementitious forming material and a combination lightweight aggregate, which preferably comprises a combination of expanded perlite and expanded vermiculite in which the weight ratio of one component to the other does not exceed about 2:1. In a particularly preferred embodiment, the weight ratio of one component to the other does not exceed about 4:3. Preferable embodiments of the combination include those in which the weight ratio of perlite to vermiculite is about 10:9, or about 4:3. A further embodiment of the composition comprises about 4 parts by weight of cementitious forming material and about 1 part by weight of lightweight aggregate. The cementitious forming material may comprise a hydraulic binder and accelerator combination, two preferred compositions of which are: Portland cement, plaster of Paris, and terra alba, present in the weight ratios of about 5:4:1, (i.e., the ratio of the weight of Portland cement to that of the plaster of Paris is about 5:4, and the ratio of plaster of Paris to terra alba is about 4:1; and calcium aluminate cement, and plaster of Paris, present in a weight ratio of about 11:5. The composition may further comprise an air entraining admixture and a surfactant, the admixture present in an amount between about 0.5 to about 2.0 percent of the total weight of the mixture, and said surfactant present in an amount between about 0.3 to about 1.5 percent of the total weight of the mixture. The surfactant may be present in an amount between about 0.53 to about 0.55 percent of the total weight, where both sulfonated melamine and napthalene formaldehyde are acceptable as a surfactant. The admixture may be present in an amount between about 0.72 to about 0.74 percent of the total weight, where neutralized vinsol resin and alpha olefin sulfonate are acceptable as the admixture.

The present invention exhibits improved curing times and strength reached in reduced times. The reduced time to cure, however, is not so short as to allow the LWIC to set prior to any screeding or raking necessary in order to adapt the surface to the desired slope, shape or texture. The composition is compatible with other LWIC material, permitting sufficient bonding thereto, and may be feather edged to a zero, or near-zero, thickness without subsequent delamination or spalling. The material does not exhibit the curing and drying shrinkages shown by other materials when used for such application. In addition, the material develops enough strength in approximately two to four hours to bear foot traffic and to sustain the roofing process, including the insertion of fasteners, without damage.

The inventive composition shows in particular a faster early rate of development of strength in retaining inserted fasteners, including base ply fasteners, however not so great a rate of strength development that it is difficult to screed or rake the material to the proper thickness, depth or slope. The material further develops an improved overall compressive strength compared to other lightweight insulating concretes. Further, the composition has a significantly high degree of homogeneity that permits the material to be easily and reliably screeded or trowelled to a zero or near-zero thickness, while also permitting it to remain bonded to the substrate material. This ability deters subsequent delamination or spalling from the substrate, and does not depend on special, detailed surface preparation of the substrate.

The combination in the proportions described above of the two different lightweight aggregates, and the perlite and vermiculite each having its own unique structure and properties, is believed to result in the novel properties described below.

DETAILED DESCRIPTION OF THE INVENTION

The composition of the lightweight insulating concrete of the present invention may be described by reference to the relative weight of the components of the composition. In one embodiment, the composition comprises (1) a cementitious forming material, preferably about 4 parts by weight, and (2) a lightweight aggregate component, preferably about 1 part by weight relative to the cementitious forming material, where the aggregate component preferably comprises expanded perlite and expanded vermiculite in which the weight ratio of one component of the aggregate to the other does not exceed about 2:1. Preferably, the weight ratio of one component of the aggregate to the other does not exceed about 4:3. Preferable embodiments of the combination include those in which the weight ratio of perlite to vermiculite is about 10:9, or about 4:3.

In yet another embodiment, these embodiments may further include from about 0.5 to about 2.0 weight percent air entraining admixture and from about 0.3 to about 1.5 weight percent surfactant. More preferably, the admixture is present in an amount between about 0.72 to about 0.74 percent of the total weight, where the admixture is selected from the group of neutralized vinsol resin and alpha olefin sulfonate, and a surfactant is present in an amount between about 0.53 to about 0.55 percent of the total weight, where the surfactant is either sulfonated melamine or napthalene formaldehyde.

A further embodiment is one in which the cementitious forming material is a hydraulic binder and accelerator combination. In another embodiment, the cementitious forming material includes Portland cement, plaster of Paris, and terra alba, in weight ratios of about 5:4:1, or calcium aluminate cement and plaster of Paris, in a weight ratio of about 11:5.

One embodiment of the composition comprises (1) a cementitious forming material and (2) a lightweight aggregate that comprises expanded perlite and expanded vermiculite components, where (3) each of said expanded perlite and expanded vermiculite components comprises at least about a third of the weight of the lightweight: aggregate. This combination is preferably about 30 to about 33 parts by weight cementitious forming material and from about 7 to about 8 parts by weight lightweight aggregate, including both perlite and vermiculite, and where both perlite and vermiculite are at least about 3 parts by weight of the about 7 to about 8 parts. In a further embodiment, the perlite and vermiculite are in the lightweight aggregate—and when the composition is used to form a LWIC, in the LWIC—in a ratio ranging from about 3:4 to about 4:3 by weight. Yet further embodiments include those in which there is a weight ratio of perlite to vermiculite of about 10:9, or about 4:3.

Another embodiment of this composition has a cementitious forming material formed of about equal parts by weight of cement and accelerator, more preferably where the cement is Portland cement, and the accelerator includes plaster of Paris and terra alba in about a 4:1 weight ratio. In still another embodiment, the formulation has a cementitious forming material including about 22 parts cement by weight, and about 10 parts accelerator by weight, more preferably one in which the cement is a calcium aluminate cement, and the accelerator includes plaster of Paris.

In yet another embodiment, these embodiments may further include from about 0.5 to about 2.0 weight percent air entraining admixture and from about 0.3 to about 1.5 weight percent surfactant. More preferably, the admixture is present in an amount between about 0.72 to about 0.74 percent of the total weight, where the admixture is selected from the group of neutralized vinsol resin and alpha olefin sulfonate, and a surfactant is present in an amount between about 0.53 to about 0.55 percent of the total weight, where the surfactant is either sulfonated melamine or napthalene formaldehyde.

Another embodiment of the composition comprises (1) a cementitious forming material and (2) a lightweight aggregate that comprises at least two of the following component materials: expanded perlite and expanded vermiculite, sintered fly ash, and expanded shale, and (3) where the concrete formed from the composition has a density after setting and oven-drying which is less than about 30 pounds per cubic foot. A preferable embodiment is one in which each of the selected component materials comprises at least about one third by weight of the lightweight aggregate. Preferably, expanded perlite and expanded vermiculite are the selected materials. Two further embodiments are ones in which the expanded perlite and expanded vermiculite component's ratio by weight is about 4:3 or about 10:9. Yet another embodiment is one where about 4 parts by weight are said cementitious forming material and about 1 part by weight is said lightweight aggregate. In another embodiment, the cementitious forming material comprises Portland cement, plaster of Paris, and terra alba, and the weight ratios of said Portland cement, plaster of Paris, and terra alba are about 5:4:1. In yet another embodiment, the cementitious forming material comprises calcium aluminate cement and plaster of Paris, and the weight ratio of said calcium aluminate cement and plaster of Paris is about 11:5.

One embodiment of the composition comprises (1) from about 75 to about 82 composition weight percent cement binder, where cement binder comprises from about 30 to about 65 composition weight percent cement, and (2) from about 20 to about 55 composition weight percent accelerator, and from about 10 to about 23 composition weight percent lightweight aggregate, of which from about 5 to about 15 composition weight percent is expanded perlite and from about 5 to about 10 composition weight percent is expanded vermiculite. The composition weight percent of, for example, the cement, refers to the weight percent of the cement in the described composition, rather than as a percent of the cement binder.

Preferably, the composition comprises from about 17.4 to about 19.8 weight percent lightweight aggregate. In another embodiment, each of the perlite and vermiculite comprising at least about 7.6 weight percent of the composition. In a further embodiment, the perlite and vermiculite are in a ratio of from about 3:4 to about 4:3 by weight. Still further preferable embodiments are those in which the ratio of perlite to vermiculite is about 10:9 or about 4:3 by weight.

The cement binder in these embodiments preferably comprises cement and accelerator. In one embodiment, the cement comprises from about 50 to about 65 composition weight percent calcium aluminate cement, and accelerator comprises from about 20 to about 30 composition weight percent plaster of Paris, preferably about 55 composition weight percent calcium aluminate cement and about 25 composition weight percent plaster of Paris.

In another embodiment, the cement comprises from about 30 to about 55 composition weight percent Portland cement, and accelerator comprises from about 20 to about 40 composition weight percent plaster of Paris, and from about 4 to about 20 composition weight percent terra alba. The cementitious forming material in another embodiment comprises about 40 weight percent cement, and about 40 weight percent accelerator, with the cement preferably being Portland cement, and the accelerator preferably including plaster of Paris and terra alba in a ratio of weight percents of about 4:1. Preferably, the cementitious forming material is about 40 composition weight percent Portland cement, about 32 composition weight percent plaster of Paris, and about 8 composition weight percent terra alba.

The expression of the amounts of these materials as weight percents refer for this purpose to the weight percents of the components described, and do not account for further material added, for instance inert material such as sand.

In another embodiment, the composition comprises (1) from about 75 to about 82 weight percent cement binder, including cement and accelerators, (2) from about 10 to about 23 weight percent lightweight aggregate, (3) from about 0.5 to about 2.0 weight percent air entrainment admixture, and (4) from about 0.3 to about 1.5 weight percent surfactant. In a preferable embodiment, the cement binder includes about 30 to about 65 weight percent (of the composition) cement, and from about 20 to about 55 weight percent (of the composition) accelerator, and the lightweight aggregate includes from about 5 to about 15 weight percent (of the composition) expanded vermiculite aggregate, from about 5 to about 10 weight percent (of the composition) expanded perlite aggregate. In a further embodiment, the lightweight aggregate comprises from about 17.4 to about 19.8 of the total composition, where each of the expanded perlite and expanded vermiculite comprise at least about 7.6 weight percent of the composition. In another embodiment, the perlite and vermiculite are present in the lightweight aggregate in a range from about 3:4 to about 4:3 ratio by weight, more preferably about 10:9, or about 4:3.

In another embodiment, the cement comprises from about 50 to about 65 composition weight percent calcium aluminate cement, and the accelerator comprises from about 20 to about 30 composition weight percent plaster of Paris. Preferably, the cement comprises about 55 composition weight percent calcium aluminate cement and the accelerator comprises about 25 composition weight percent plaster of Paris In another embodiment, the cement comprises from about 30 to about 50 composition weight percent Portland cement, and the accelerator comprises from about 20 to about 40 composition weight percent plaster of Paris, and from about 4 to about 20 composition weight percent terra alba. Preferably, the cement comprises about 40 composition weight percent Portland cement, and the accelerator comprises about 32 composition weight percent plaster of Paris, and about 8 composition weight percent terra alba.

The composition in a further embodiment, can comprise from about 0.5 to about 2.0 weight percent air entraining admixture, and from about 0.3 to about 1.5 weight percent surfactant. Even more preferably, the admixture is in an amount between about 0.72 to about 0.74 percent of the total weight, and is either neutralized vinsol resin and alpha olefin sulfonate, and the surfactant is in an amount between about 0.53 to about 0.55 percent of the total weight, and is either sulfonated melamine and napthalene formaldehyde.

In yet another embodiment, the composition (1) comprises about 80 weight percent cement binder composition, including any accelerators, (2) from about 7.8 to about 9.1 weight percent expanded vermiculite aggregate, (3) from about 9.6 to about 10.7 weight percent expanded perlite aggregate, (4) from about 0.68 to about 0.78 weight percent air entrainment admixture, and (5) from about 0.50 to about 0.60 weight percent surfactant. More preferably, this embodiment comprises about 80 weight percent cement binder composition, including any accelerators, about 7.9 weight percent expanded vermiculite aggregate, from about 10.5 to about 10.6 weight percent expanded perlite aggregate, from about 0.72 to about 0.74 weight percent air entrainment admixture, and from about 0.53 to about 0.55 weight percent surfactant.

In another embodiment, the composition comprises (1) about 4 parts by weight of a cementitious forming material, which comprises a hydraulic binder and accelerator combination that is either (i) a first combination including Portland cement, plaster of Paris and terra alba in weight ratios of about 5:4:1, or (ii) a second combination including calcium aluminate cement and plaster of Paris in a weight ratio of about 11:5; (2) about 1 part by weight of a lightweight aggregate, which comprises an expanded perlite fraction and an expanded vermiculite fraction, and the ratio by weight of the fractions does not exceed about 2:1; (3) an air entraining admixture in an amount between about 0.5 and about 2.0 percent of the total weight, which is either neutralized vinsol resin or alpha olefin sulfonate; and (4) a surfactant in an amount between about 0.3 and about 1.5 percent of the total weight, which is either sulfonated melamine and napthalene formaldehyde. Preferably, the weight ratio of the fractions does not exceed about 4:3. In a preferred embodiment of the composition, the admixture is from about 0.72 to about 0.74 percent of the total weight. In another preferred embodiment, the surfactant is from about 0.53 to about 0.55 percent of the total weight.

To the above embodiments, water is added sufficient to hydrate the cementitious binder and to render the wet mixture pumpable and also workable after placement. The specific amount of water used to hydrate the cement/binder composition falls in a range from about 80 to about 120 weight percent, and preferably is about 90 weight percent. Excess water is undesirable because it may lead to segregation of specific components of the overall composition. Insufficient water is also undesirable because it could result in insufficient hydration of the cement and binder components of the composition, resulting in lower strength.

A cementitious forming material is used to bind together aggregate materials, including both expanded perlite and expanded vermiculite. The cementitious forming material used in this invention preferably includes a hydraulic binder and some form of an accelerator to reduce the set time. A first formulation generally comprises a calcium aluminate cement combined with plaster of Paris. A second formulation generally comprises Portland cement, plaster of Paris, and another accelerator, preferably terra alba.

The calcium aluminate cement used is a hydraulic cement manufactured by grinding "clinker" composed primarily of bauxite (aluminum oxide) and limestone (calcium carbonate). Calcium aluminate cements are useful for their resistance to high temperature and flexibility in "set" or hydration time. Calcium aluminate cements may have a bulk density of approximately 1.16 to 1.37 grams/cm$^3$. One calcium aluminate cement found suitable for use in the invention is LUMNITE MG5 brand calcium aluminate cement available from Heidelberger Calcium Aluminates, Inc., 7660 Imperial Way, Allentown, Pa. 18195–1040.

The Portland cement used is a hydraulic cement produced by grinding "clinker" consisting essentially of calcium silicates with minor amounts of calcium sulfate interground with them. ASTM C150 Types I, II, or III are suitable grades of Portland cement. The Portland cement used in this embodiment was not mixed with lime, hydrated lime, or lime putty. Acceptable Portland cements are commonly available from manufacturers such as Holnam Inc., 6211 Ann Arbor Rd., PO BOX, 122 Dundee, Mich. 48131 and Ash Grove Cement West Inc., 320 Union Pacific Way, Elko, Nev. 89801-4622

Plaster of Paris refers to any of a group of gypsum cements, essentially hemihydrated calcium sulfate, $CaSO_4 \cdot \frac{1}{2}H_2O$, calcium sulfate hemihydrate powder. It is also a hydraulic binder. When mixed with water, it reacts and becomes calcium sulfate dihydrate, a solid cemented matrix.

In the present invention, plaster of Paris also acts as an accelerator for the Portland or calcium aluminate cements. The mechanism of acceleration is not clearly understood. It likely has to do with providing a source of soluble sulfate which contributes to the formation of early strength constituents (ettringite) of Portland cement. Also, plaster of Paris is believed to undergo its own set and actually be the early strength contributor (as a minor constituent binder).

Acceptable plaster of Paris used in the present invention are SUNFLOWER brand molding plaster manufactured by Georgia-Pacific Corp., 133 Peachtree St., is Atlanta, Ga. 30348 and also STRUCTO brand manufactured by United States Gypsum Co., 125 So. Franklin St., Chicago, Ill. 60606-4678. Materials such as PYROFILL brand gypsum concrete, also from United States Gypsum, which contains small amounts of wood shavings, can also be expected to provide acceptable results.

Terra alba is finely pulverized gypsum, $CaSO_4 \cdot 2H_2O$, i.e. calcium sulfate dihydrate. It is not a hydraulic binder, because as there is no capacity for further hydration on exposure to water. It functions as a source of soluble sulfate in the present composition, as an accelerator for the plaster of Paris component. Sources of terra alba include both Georgia-Pacific Corp. and United States Gypsum Co., above. Other materials capable as acting as accelerators include lithium carbonate, calcium chloride, and calcium nitrate- and calcium thiocyanate-based compounds.

The lightweight aggregate used in the present invention includes both expanded perlite and expanded vermiculite. The primary consideration in selecting acceptable lightweight aggregates include final desired strength and density. Persons skilled in the art will recognize that other acceptable lightweight aggregates may satisfy such considerations.

Other lightweight aggregates such as sintered fly ash, or expanded shale, may be substituted for either the perlite or vermiculite in roughly equal weights of those components. Substituting for either vermiculite or perlite may result in slightly greater overall density, and increased strength of the lightweight insulating concrete, which may be acceptable in some applications, while not offering all of the advantages of embodiments having both expanded perlite and expanded vermiculite, such as low density, handleability and reduced set times.

In The expanded vermiculite aggregate used in the present invention is a form of mica, hydrated laminar magnesium-aluminum-iron silicate. Interlayer water molecules present are not part of the mineral structure. When subjected to high temperature, the water is vaporized and expands or exfoliates the mineral layers. The result is a low density inorganic material that has a number of uses as a low density aggregate for cementious and agricultural compositions. One function of the aggregate in the invention is to reduce the density of the cementious mixture to a level compatible with lightweight insulating concrete. Other functions are to retain moisture, to improve homogeneity of the composition, and to improve the "handleability" of the composition. Further, it functions to improve the composition's ability to form thin layers that resist delamination from their underlying substrate. In addition, the lower density of the expanded vermiculite permits the concrete composition to have a lower thermal conductance, and cause a roof deck formed of the material to have improved insulating properties. Expanded vermiculite is generally characterized primarily by particle size distribution and loose bulk density. Vermiculite aggregate found acceptable for use in this invention is characterized by ASTM C 332 as Group I (fine). This expanded vermiculite is available as ZONOLITE brand from W.R. Grace & Company, Grace Construction Products, 62 Whittemore Avenue, Cambridge, Mass. 02140 and as MICRON brand from Strong-Lite Products, Pine Bluff, Ark. 71611.

The perlite used in the present invention is an expanded volcanic glass. It has uses similar to vermiculite, including as a low density aggregate. Acceptable perlite for this composition is a very fine grade functioning primarily as an additive enhancing trowelability of the wet material, in addition to reducing density and weight of the composition. Enhanced trowelability contributes to the ability to feather-edge the product to zero, or near-zero, thickness at the layer's edge. The particles typically pass 90% through a no. 100 mesh screen and have a loose pour density of about 8–12 pounds per cubic foot (128.2–192.3 k/gm$^3$). In addition, the lower density of the expanded perlite permits the concrete composition to have a lower thermal conductance, and causes a roof deck partially formed of the material to have improved insulating properties. The expanded perlite is available as ZONOLITE brand from W. R. Grace & Company, above, and from Strong-Lite, above.

Sintered fly ash is a product formed using fly ash, a material defined by ASTM C618 as "finely divided residue that results from the combustion of ground or powdered coal." Classes C & F fly ash consist of $SiO_2$, $Al_2O_3$ and $Fe_2O_3$; Class C in a minimum amount of 50% and Class F in a minimum amount of 70%. Class C typically results from burning sub-bituminous coal, while Class F typically results from burning bituminous coal. Fly ash is then heated to temperatures sufficient to sinter some of the particles to one another, resulting in larger particles of low density. Expanded shale is a material obtained by heating shale to elevated temperatures to cause it to increase its volume, resulting in a material having a reduced density. An expanded shale that may be suitable for use in the present invention is one meeting ASTM C332 (Group II).

Air entraining admixtures are alkali-tolerant surfactants used to maintain relatively low densities, via incorporation of discrete stable air cells that do not coalesce with one another. They also create homogeneous set slurries that do not segregate. By acting to entrain air with the mixture during the process of mixing or pumping, the effective density of the concrete composition is lowered. Too great a weight percent of air entraining admixture has the negative effect of entraining too much air, which may result in the concrete being of too low density. Conversely, insufficient entrained air resulting from a lower percentage of air entraining admixture, may also result in an overly dense composition and increased weight. Acceptable commercially available air entraining admixtures include: neutralized vinsol resin, from Hercules Food and Functional, 1313 North Market Street FL 2, Wilmington, Del. 19801, and ZCA air entraining agent, BIO-TERGE AS90 brand alpha olefin sulfonate, from Stepan Company, 22 West Frontage Road, Northfield, Ill. 60093, and WITCONATE-A03 brand air entrainment agent, available from Whitco Chemical, One American Lane, Greenwich, Conn. 06831. Other acceptable admixtures may be known to persons skilled in the art, and may include non-ionic condensates of octylphenol and ethylene oxides.

Water reducers and superplasticizers are surfactants that improve the "wettability" of the solid materials in cementitious compositions, causing the composition to be more fluid with less mix water, enhancing strength and finishability. Common water reducers based on lignosulfonate admixtures reduce the water requirement by 6 to 10% at usable dosages. One concern is that higher dosages of lignosulfonate materials have the adverse effect of set retardation, i.e., increasing the time for the concrete to set. Superplasticizers exhibit a more pronounced effect than ordinary water reducers, and are capable of reducing water demand up to 30% with no material adverse impact on the concrete or cement chemistry, or the set time. Two common families of superplasticizers are based on sulfonated melamine and napthalene formaldehyde. Two superplasticizers acceptable for use in the present invention are DAXAD 19 brand napthalene formaldehyde, manufactured by W. R. Grace & Company, Grace Construction Products, 62 Whittemore Avenue, Cambridge, Mass. 02140, and MELMENT F10 brand sulfonated melamine, manufactured by SKW Chemicals Inc., 1509 Johnson Ferry Road #150, Marietta, Ga. 30062. Other acceptable water reducers and superplasticizers may be known to persons skilled in the art.

EXAMPLE I

Place 37.5 pounds (17.01 kg) of LUMNITE brand calcium aluminate cement, and 17.3 pounds (7.85 kg) of SUNFLOWER brand molding plaster of Paris in a rotating drum mixer whose size is suitable for the amount of material to be produced, in this case about 68 pounds, total (30.85 kg), and which is capable of efficiently blending dry mixtures. Examples of such equipment includes a 3 ft.$^3$ (85 liter) mixer, RED LION model RLX-3 by Monarch Industries Limited, 889 Erin St., Winnipeg 10, Manitoba Canada. Add to the mixer 5.40 pounds (2.45 kg) of ASTM C332, Group I (fine) expanded vermiculite, and 7.2 pounds (3.27 kg) of expanded perlite, the particles of which typically pass 90% through a no. 100 mesh screen and have a loose pour density of about 8–12 pounds per cubic foot (128.2–192.3 kg/m$^3$). The order in which the binders, aggregates and accelerants are introduced into the mixing device is not known to to be important. An acceptable procedure is for the cement, plaster and aggregates to be added in their entirety at one time. In addition, aliquoting portions and adding them in alternate fashion is also acceptable for the invention. The mixer is rotated briefly after each mixing step. Mix these dry materials until there is no visible segregation of the various components, usually about two minutes. A dense inert material, such as sand, may be added if desired; however, doing so is usually not beneficial as it increases the weight of the concrete without adding significant strength. Once the major components are sufficiently blended, add 0.36 pound (163.3 g) of MELMENT F10 brand sulfonated melamine, and 0.50 pound (226.9 g) ZCA BIO-TERGE AS-90 brand air entraining agent, and blend for 2–3 minutes until minor ingredients are well dispersed. The mixture will still appear dry.

In order to use this premix composition, it is blended with water, typically at the site where it will be applied. The wet slurry is suitable for mixing either by hand or by machine, depending upon the amount to be applied. For hand mixing, in a suitable container, for example, a 5 gallon (19 liter) plastic pail, place about 2⅛ gallons of water (8.1 liters) (or about 18 pounds (8.2 kg), about 90% of the premix composition weight), measured using a graduated container or by weighing the water to be added with a platform spring scale. The water is preferably potable water that is clean and free of deleterious amounts of acid, alkali and organic materials. Add about 20 pounds (9.1 kg) of the premix composition to the water. Blend the water and premix composition with a paddle mixer powered by a hand-held drill motor for 1–3 minutes until the material reaches a creamy homogeneous consistency meeting the flowability criterion below. For mixing by machine, there are many stationary drum rotating mixing devices available that are suitable. Choosing a mixer will depend primarily on the amount of material desired to be mixed at one time. For the above described mix, a model SC-90 mixer by Whiteman Conspray, 255 Woodford Ave., Elyria, Ohio 44035 was found to be acceptable. Place in the mix about 7¼ gallons of water (27.55 liters) (or about 61.2 pounds (27.8 kg) (about 90% of the premix composition weight), measured using a graduated container or by weighing the water to be added with a platform spring scale. The water is preferably potable water that is clean and free of deleterious amounts of acid, alkali and organic materials. Add about 68 pounds (30.8 kg) of the premix composition to the water, and run the mixer until the material reaches a creamy homogeneous consistency meeting the flowability criterion below.

There are also small to medium size plaster pumps (rotor/stator type) that can be used to convey the material. Again, selecting the specific piece of pumping equipment will depend on how much material is needed in a given period of time. If a pump is used, it must be matched with the mixer in terms of mixing and pumping volumes over time. Based on known uses, acceptable mixers are believed to include the SEAL MASTER II by Strong Manufacturing Co., Inc., P.O. Box 8068, Pine Bluff, Ark. 71611, and the SUN 110 pan mixer by SCN Marketing, P.O. Box 6274, Daytona Beach, Fla. 32122. Place the wet slurry into the pump hopper, and operate the pump to convey the wet slurry to the rooftop as needed.

EXAMPLE II

Place 27.5 pounds (12.47 kg) of ASH GROVE brand type I Portland cement, 22.0 pounds (9.98 kg) of GP brand molding plaster of Paris, and 5.50 pounds (2.49 kg) of terra alba in a rotating drum mixer whose size is suitable for the volume of material to be produced, in this case about 68 pounds, total (30.85 kg). The mixer in Example I is acceptable. Add to the mixer 5.40 pounds (2.45 kg) of ASTM C332, Group I (fine) expanded vermiculite, and 7.2 pounds (3.27 kg) of expanded perlite, the particles of which typically pass 90% through a no. 100 mesh screen and have a loose pour density of about 8–12 pounds per cubic foot (128.2–192.3 kg/m$^3$). Follow the mixing steps of Example I. The same remarks about a dense inert material apply. Once the major components are sufficiently blended, add 0.36 pound (163.3 g) of MELMENT F10 branch sulfonated melamine, and 0.50 pound (226.9 g) ZCA BIO-TERGE AS-90 brand air entraining agent. Use the steps for blending these materials disclosed in Example I. In order to use this premix composition, use the same procedures described above.

The characteristics of the wet slurry formed after adding and mixing the water were checked for quality control by examining its density and its slump.

The wet density was checked using the following procedure: weigh a container of known volume, and then fill it with the wet slurry; a container of 5 fl. oz. (148 ml) was used. Weigh the filled container, and subtract the tare weight of the container. Calculate the slurry density based on the net weight of the wet slurry and the container volume. Wet density in the range of about 60–80 pounds per cubic foot (961.5–1282 kg/m$^3$) is acceptable; wet density in the range of from about 65 to about 75 pounds per cubic foot (1041.6–1201.9 kg/m$^3$) is preferred. Wet density values of numerous, formulations are provided in Table 1, below.

In order to measure the slump, or consistency, of the wet slurry, the following procedure was used. Place a PVC pipe cylinder, 4 inches high by 2 inches in diameter (10.16 by 5.08 cm), on a glass or polyacrylate sheet. Fill the pipe with the wet slurry. Strike off the top evenly and carefully lift the cylinder straight up. Measure the diameter of the resulting circular deposition of material. Diameters of about 6–9 inches (15.24–22.86 cm) are acceptable.

The set time of the lightweight concrete formed using the present invention is important, and may be tested. The set time is important because workers cannot, or should not, be permitted to walk on the concrete prior to its setting, nor can the waterproof membrane be affixed, because the concrete is not ready to properly accept and hold fasteners used to secure the membrane. The term "set" in this context means that the material can be walked on and roof membrane fastening may commence. Set times of about 1–4 hours are acceptable; strength gain will continue well beyond this point in time. A composition that will cure to set in about 2 to about 4 hours is preferable. When the penetration resistance (PR) reaches 250–350 pounds force per square inch (psi.) (1.724–2.414 MPa), the material is considered set. A PR of more than about 350 p.s.i. is considered undesirable if reached in less than about 1 hour, because it will not allow enough "open time" during which fasteners may be inserted and the roof membrane installed for the material to be practically usable.

In order to determine the PR, fill a 5 fluid ounce (148 ml) light, resilient polystyrene plastic foam (e.g., STYROFOAM brand) cup or nominal 1 inch (2.54 cm) deep plastic tray with the wet slurry material formed by mixing water with the premix material. Periodically probe the surface of the concrete material to a depth of ¼ inch (6.35 mm) with a concrete penetrometer equipped with a probe, e.g. a SOILTEST brand Model CT 421A, available from ELE International, Inc., Soiltest Products Division, P.O. Box 8004, 86 Albrecht Drive, Lake Bluff, Ill. 60044–8004. A probe having a ¼ inch (6.35 mm) diameter was found acceptable. Alternatively, the PR may be measured with respect to a "patch" rather than in a tray or cup. In this case, the wet slurry material is used to fill an existing defect or hole left in a LWIC surface by removal of a fastener, specifically a ZONOLITE brand base ply or NVS brand fastener, that is about 1 inch by 3 inches and about 1–2 inches deep (2.45 by 7.35 by 2.45–4.9 cm). It is noted that higher PR values are achieved for the same composition when the test is conducted on a patch. This is believed to result from the porous surrounding concrete absorbing some of the excess water in the composition, increasing the apparent "strength." This PR-measuring test is not believed to directly measure compressive or shear strength of the concrete. Various compositions were made using the above procedures and tested to determine the achieved PR, and wet density, the results of which are found in Table 1, below.

| Components: | Example No.: III | | IV | | V | |
|---|---|---|---|---|---|---|
| | Pounds | Wt. % | Pounds | Wt. % | Pounds | Wt. |
| LUMNITE MG5 Calcium Aluminate Cement | 0.00 | 0.00 | 606.00 | 55.96 | 0.00 | 0.00 |
| STRONG Type 1 Portland Cement | 606.00 | 55.96 | 0.00 | 0.00 | 0.00 | 0.00 |
| HOLNAM Type 1 Portland Cement | | 0.00 | 0.00 | 0.00 | 606.00 | 55.96 |
| ASH GROVE Type 1 Portland Cement | | 0.00 | 0.00 | 0.00 | 0.00 | 0.00 |
| PYROFILL Gypsum Cement | 260.00 | 24.01 | 260.00 | 24.01 | 260.00 | 24.01 |
| SUNFLOWER Molding Plaster | | 0.00 | 0.00 | 0.00 | 0.00 | 0.00 |
| GP Terra Alba | | 0.00 | 0.00 | 0.00 | 0.00 | 0.00 |
| Perlite Bag House Fines | 105.00 | 9.70 | 105.00 | 9.70 | 105.00 | 9.70 |
| MICRON Vermiculite | 98.00 | 9.05 | 98.00 | 9.05 | 98.00 | 9.05 |
| MELMENT F10 | 6.00 | 0.55 | 6.00 | 0.55 | 6.00 | 0.55 |
| ZCA Air Entraining Agent | 8.00 | 0.74 | 8.00 | 0.74 | 8.00 | 0.74 |
| Total | 1083.00 | 100.00 | 1083.00 | 100.00 | 1083.00 | 100.00 |
| Water | 950.00 | | 950.00 | | 950.00 | |
| Wet Density (lbs./ft$^3$) | 73.79 | | n/a | | n/a | |
| Notes: | Tray | Patch | Tray | Patch | Tray | Patch |
| | No Set | | 2'20"/240 | 2'20"/360 | 1'20"/100 | 1'20"/260 |
| | 1 day | 1'/260 | 2'45"/260 | 2'45"/440 | 2'10"/100 | 2'10"/280 |
| | nail = 46 lbf. | 2'30"/300 | 3'10"/300 | 3'10"/500 | 2'55"/100 | 2'55"/300 |

| Components: | Example No.: VI | | VII | | VIII | |
|---|---|---|---|---|---|---|
| | Pounds | Wt. % | Pounds | Wt. % | Pounds | Wt. |
| LUMNITE MG5 Calcium Aluminate Cement | 0.00 | 0.00 | 0.00 | 0.00 | 0.00 | 0.00 |
| STRONG Type 1 Portland Cement | 0.00 | 0.00 | 0.00 | 0.00 | 0.00 | 0.00 |
| HOLNAM Type 1 Portland Cement | 0.00 | 0.00 | 0.00 | 0.00 | 0.00 | 0.00 |
| ASH GROVE Type 1 Portland Cement | 0.00 | 0.00 | 606.00 | 55.96 | 606.00 | 55.96 |
| PYROFILL Gypsum Cement | 1000.00 | 100.00 | 260.00 | 24.01 | 0.00 | 0.00 |
| SUNFLOWER Molding Plaster | 0.00 | 0.00 | 0.00 | 0.00 | 260.00 | 24.01 |
| GP Terra Alba | 0.00 | 0.00 | 0.00 | 0.00 | 0.00 | 0.00 |
| Perlite Bag House Fines | 0.00 | 0.00 | 105.00 | 9.70 | 105.00 | 9.70 |
| MICRON Vermiculite | 0.00 | 0.00 | 98.00 | 9.05 | 98.00 | 9.05 |
| MELMENT F10 | 0.00 | 0.00 | 6.00 | 0.55 | 6.00 | 0.55 |
| ZCA Air Entraining Agent | 0.00 | 0.00 | 8.00 | 0.74 | 8.00 | 0.74 |
| Total | 1000.00 | 100.00 | 1083.00 | 100.00 | 1083.00 | 100.00 |
| Water | 950.00 | | 950.00 | | 975.00 | |
| Wet Density (lbs./ft$^3$) | 86.04 | | 72.85 | | 65.63 | |
| Notes: | Tray | Patch | Tray | Patch | Tray | Patch |
| | 1'10"/160 | 1'10"/220 | 1'30"/120 | 1'30"/200 | 3'10"/70 | 3'10"/100 |
| | 1'30"/600 | 1'30"/>700 | 2'40"/100 | 2'40"/240 | | |
| | | | 4'20"/100 | 4'20"/200 | | |

| Components: | Formula I.D.: IX | | X | | XI | |
|---|---|---|---|---|---|---|
| | Pounds | Wt. % | Pounds | Wt. % | Pounds | Wt. % |
| LUMNITE MG5 Calcium Aluminate Cement | 0.00 | 0.00 | 606.00 | 55.96 | 0.00 | 0.00 |
| STRONG Type 1 Portland Cement | 0.00 | 0.00 | 0.00 | 0.00 | 0.00 | 0.00 |
| HOLNAM Type 1 Portland Cement | 0.00 | 0.00 | 0.00 | 0.00 | 0.00 | 0.00 |
| Ash Grove Type 1 Portland Cement | 606.00 | 55.96 | 0.00 | 0.00 | 433.00 | 39.98 |
| PYROFILL Gypsum Cement | 0.00 | 0.00 | 0.00 | 0.00 | 0.00 | 0.00 |
| GP Molding Plaster | 200.00 | 18.47 | 260.00 | 24.01 | 346.00 | 31.95 |
| GP Terra Alba | 60.00 | 5.54 | 0.00 | 0.00 | 87.00 | 8.03 |
| Perlite Bag House Fines | 105.00 | 9.70 | 105.00 | 9.70 | 105.00 | 9.70 |

-continued

| | | | | | | |
|---|---|---|---|---|---|---|
| Micron Vermiculite | 98.00 | 9.05 | 98.00 | 9.05 | 98.00 | 9.05 |
| MELMENT F10 | 6.00 | 0.55 | 6.00 | 0.55 | 60.00 | 0.55 |
| ZCA Air Entraining Agent | 8.00 | 0.74 | 8.00 | 0.74 | 8.00 | 0.74 |
| Total | 1083.00 | 100.00 | 1083.00 | 100.00 | 1083.00 | 100.00 |
| Water | 975.00 | | 975.00 | | 975.00 | |
| Wet Density (lbs./ft$^3$) | 70.96 | | 75.05 | | 73.7272 | |
| Notes: | Tray | Patch | Tray | Patch | Tray | Patch |
| | 1'/60 | 1'/140 | 1'10"/40 | 1'10"/200 | 25"/100 | 25"/240 |
| | 2'45"/60 | 2"45"/120 | 2'10"/240 | 2'10"/360 | 1'35"/160 | 1'35"/380 |
| | | | 2'50"/320 | 2'50"/500 | 2'55"/200 | 2'55"/400 |

| | Formula I.D.: | | | |
|---|---|---|---|---|
| | XII | | XIII | |
| Components: | Pounds | Wt. % | Pounds | Wt. % |
| LUMNITE MG5 Calcium Aluminate Cement | 37.50 | 54.94 | 0.00 | 0.00 |
| STRONG Type 1 Portland Cement | 0.00 | 0.00 | 0.00 | 0.00 |
| HOLNAM Type 1 Portland Cement | 0.00 | 0.00 | 0.00 | 0.00 |
| Ash Grove Type 1 Portland Cement | 0.00 | 0.00 | 27.50 | 40.17 |
| PYROFILL Gypsum Cement | 0.00 | 0.00 | 0.00 | 0.00 |
| GP Molding Plaster | 17.30 | 25.34 | 22.00 | 32.14 |
| GP Terra Alba | 0.00 | 0.00 | 5.50 | 8.03 |
| Perlite Bag House Fines | 7.20 | 10.55 | 7.20 | 10.52 |
| Micron Vermiculite | 5.40 | 7.91 | 5.40 | 7.89 |
| MELMENT F10 | 0.36 | 0.53 | 0.36 | 0.53 |
| ZCA Air Entraining Agent | 0.50 | 0.73 | 0.50 | 0.73 |
| Total | 68.26 | 100.00 | 68.46 | 100.00 |
| Water | n/a | n/a | | |
| Wet Density (lbs./ft$^3$) | n/a | | | |

Tray = Hours & minutes at test/PR (in p.s.i.) of material in a tray
Patch = Hours & minutes at test/PR (in p.s.i.) of material in a patch/hole The characteristics of the lightweight insulating concrete formed by this composition after setting may be determined in several ways.

Tests were conducted comparing a lightweight insulating concrete of the present invention and PYROFILL brand gypsum concrete used for similar applications, which was composed primarily of plaster of Paris, and the remainder cellulose fiber, about 5% sold by U.S. Gypsum. The LWIC of the present invention in this test comprised a concrete formed using the composition of Example I.

The density and compressive strength of the concrete were measured in compliance with ASTM C495-91a. A desirable minimum oven-dry density should be about 30 pounds/foot$^3$ (480.75 kg/m$^3$). Tests may be conducted at intervals of 1, 3 and 7 days. A desirable minimum compressive strength should be about 300 p.s.i. (2.069 MPa) within and during the one week period following application of the concrete. To some extent, the material will gain additional compressive strength as it continues to cure. Compressive strength values are provided in Table 2, below.

(1.27 cm) of the concrete above an existing LWIC substrate. Insert a fastener (ZONOLITE or NVS brand fasteners are acceptable) into the material within 1–4 after the concrete has set. The fastener must be inserted through an appropiate pulling sqaddle, and is inserted to a depth of 1.8 inches (4.6 cm). Thus, in the two-layer test, the fastner penetrates the existing substrate. Remove fastners after successively longer periods (1 & 3 days, and 7, 21 & 28 days for the two-layer test) using an appropiate spring scale or physical testing machine. Model STM-10 by United Testing Machine, 5802 Engineer Dr., Huntington Beach, Calif. 92649 or model 1122 by Instron Testing Machine, 21624 Melrose Ave., Southfield, Mich. 48075 have been found to ba acceptable. A minimum pull-out resistance of about 4 pounds force (177.9 N) per fastner is acceptable; a greater pull-out resistance within 1 day or 3 days is desirable, as the fastners serve to retain the waterproof membrane protecting the underlying LWIC, as well as the structure, from potential water damage. This is greater pull-out resistance is preferably more than about 100 pounds force (444.8 N)These values are provided in ther Table 3, below.

TABLE 2

| Compression Test (in p.s.i.) | Days after insertion | Inventive Material | Gypsum Concrete |
|---|---|---|---|
| | 1 | 506.6 | 147.1 |
| | 3 | 367.9 | 162.0 |
| | 7 | 523.5 | 156.1 |

A further method of determining the characteristics of the concrete formed is to measure the holding power of a fastener inserted into the concrete. Two different tests were carried out, in which the material was applied in a single 2-inch layer (5.08 cm), and in two layers, a ½-inch layer

TABLE 3

| Fastener Removal (pounds force) | Days after insertion | Inventive Material | Gypsum Concrete |
|---|---|---|---|
| Single 2" Layer | 1 | 200+ | 69 |
| | 3 | 200+ | 78 |
| | 7 | 200+ | 94 |
| | 21 | 200+ | 200+ |
| | 28 | 200+ | 200+ |
| Two-layer: ½" over substrate | 1 | 200+ | 174 |
| | 3 | 200+ | 180 |

Damage to the concrete roof surface often arises from removal, or partial removal, of a waterproof membrane, and the consequent removal of base ply and other fastners and devices from the existing substrate. The present inventive composition may be used to patch or otherwise repair concrete roof deck surfaces in the following manner. It is also believed that some of the various formulations disclosed that have longer set times could be used in re-roofing applications, although presently this would be cost-prohibitive.

In order to patch a damaged surface, an amount of material is prepared as described above, appropriate to the volume of the cracks, depressions, holes or other damaged areas. Typically, five gallons (18.9 liters) of the wet slurry will fill about 75 holes left by removal of fasteners. The area to be repaired or filled is cleaned of loose debris and foreign material. The interior is wetted, but not so as to allow liquid water to pool in the bottom thereof. A trowel is used to place an amount of the concrete slurry into the hole to create a patch. It is preferred that about 5–10% more than the volume needed to fill the hole is placed in order to ensure there is a sufficient amount to fill the hole without leaving any air pockets. Optionally, a rod or wire of a lesser diameter than the hole may be inserted and moved about therein, to ensure the hole is filled, and that air pockets do not remain. The trowel is used to scrape the slurry material that lies above the surface of the existing substrate to form a flat surface of the patch. A trowel is used to feather-edge the slurry to a zero, or near-zero thickness at its edges, thus forming a smooth transition from patch to substrate. Then the patch is permitted to cure. Set should occur within about 2 to 4 hours after the slurry is applied to create the patch. A similar method may be used to repair areas such as those which form depressions within the existing substrate and permit the ponding of water on the concrete, or more typically, on the waterproof membrane lying above. To repair such depressions, prior to installing a new waterproof membrane, the above steps may be repeated, except that the concrete slurry may be poured into the depression in an amount appropriate to cause it to be level with the surrounding concrete. Any holes in the depression from fastener removal should be addressed prior to this step using the procedure above. A metal screed of a length appropriate to the size of the depression is used to level off the slurry with the surrounding concrete. Alternatively, another tool may be used, such as a two-by-four board. Then, the edges of the patch are finished off by feather-edging as above. Then the patch is permitted to cure. It should set within 2–4 hours of application, although this time may be affected by factors such as humidity, temperature, wind and sunshine. A conventional waterproofing membrane may be applied over the patch or repair, after it has set, and fasteners may be placed into the newly applied LWIC concrete. Compression or pressure-molding of the concrete slurry is not necessary. Any of the embodiments described previously may be used to carry out these methods.

The further scope of this invention will become apparent upon the review of the detailed description of the preferred embodiments. It should however be understood that these descriptions do not limit the scope of the invention and are given as examples only, and that various changes and modifications which are fully within the scope of the present invention will become apparent to those skilled in the art.

The invention claimed is:

1. A composition of matter suitable for forming lightweight insulating concrete, comprising:
   a cementitious forming material selected from the group consisting of (i) a combination of Portland cement, plaster of Paris, and terra alba, and (ii) a combination of calcium aluminate cement, and plaster of Paris; and
   a combination lightweight aggregate comprising an expanded perlite component and an expanded vermiculite component, wherein in which a ratio by weight of eiter of said components to the other of said components does not exceed about 2:1.

2. The composition of matter of claim 1, wherein said cementitious forming material comprises Portland cement, plaster of Paris, and terra alba, in weight ratios of about 5:4:1.

3. The composition of matter of claim 1, wherein said cementitious forming material comprises calcium aluminate cement and plaster of Paris in a weight ratio of about 11:5.

4. The composition of matter of claim 1, further comprising an air entraining admixture in an amount between about 0.5 and about 2.0 percent of the weight of said cementitious forming material and said lightweight aggregate, and a surfactant in an amount between about 0.3 and about 1.5 percent of the weight of said cementitious forming material and said lightweight aggregate.

5. A composition of matter suitable for forming lightweight insulating concrete, comprising:
   about 30 to about 33 parts by weight cementitious forming material comprising cement and accelerator in about equal parts by weight; and
   about 7 to about 8 parts by weight lightweight aggregate, said lightweight aggregate comprising an expanded perlite component and an expanded vermiculite component, and wherein each of said components is at least about 3 parts by weight of said about 7 to about 8 parts.

6. The composition of matter of claim 5, wherein said cement is Portland cement and said accelerator comprises plaster of Paris and terra alba in a ratio of about 4:1 by weight.

7. A composition of matter suitable for forming lightweight insulating concrete, comprising:
   about 30 to about 33 parts by weight cementitious forming material, wherein said cementitious forming material is about 22 parts by weight cement and about 10 parts by weight accelerator; and
   about 7 to about 8 parts by weight lightweight aggregate, said lightweight aggregate comprising an expanded perlite component and an expanded vermiculite component, and wherein each of said components is at least about 3 parts by weight of said about 7 to about 8 parts.

8. The composition of matter of claim 7, wherein said cement is calcium aluminate cement, and said accelerator comprises plaster of Paris.

9. A composition of matter suitable for forming lightweight insulating concrete, comprising:
   a cemcntitious forimlilnu material;
   a lightweight aggregtate, said lightweight aggregate comprising an expanded perlite component and an expanded vermiculite component, wherein each of said components comprises at least about a third of said lightweight aggregate by weight; and
   an air entraining admixture in an amount between about 0.5 and about 2.0 percent by weight of the cementitious forming material and lightweight aggregate, and a surfactant in an amount between about 0.3 and about 1.5 percent by weight of the cementitious forming material and lightweight aggregate.

10. The composition of matter of claim 9, wherein said admixture is present in an amount between about 0.72 and about 0.74 percent of the total weight, and said admixture is selected from the group of neutralized vinsol resin and alpha olefin sulfonate, and wherein said surfactant is present in an amount between about 0.53 and about 0.55 percent of the total weight, and said surfactant is selected from the group of sulfonated melamine and napthalene formaldehyde.

11. A composition of matter suitable for forming a lightweight insulating concrete, comprising:
- a cementitious forming material comprising Portland cement, plaster of Paris, and terra alba, wherein the weight ratios of said Portland cement, plaster of Paris, and terra alba are about 5:4:1; and
- a lightweight aggreaate comprising at least two component materials selected from the group consisting of expanded vermiculite, expanded perlite, sintered fly ash and expanded shale;
- wherein the concrete formed from the composition has a density after setting and oven-drying which is less than about 30 pounds per cubic foot.

12. A composition of matter suitable for forming a lightweight insulating concrete, comprising:
- a cementitious forming material comprising calcium aluminate cement and plaster of Paris wherein the weight ratio of said calcium aluminiate cement and plaster of Paris is about 11:5; and
- a lightweight agregate comprising at least two component materials selected from the group consisting of expanded verniculite, expanded perlite, sintered fly ash and expanded shale;
- wherein the concrete formed from the composition has a density after setting and oven-drying which is less than about 30 pounds per cubic foot.

13. A composition of matter suitable for forming lightweight insulating concrete, comprising:
- from about 75 to about 82 composition weight percent cement binder, wherein said cement binder comprises from about 30 to about 65 composition weight percent cement and from about 20 to about 55 composition weight percent accelerator; and
- from about 10 to about 23 composition weight percent lightweight aggregate, wherein said lightweight aggregate comprises from about 5 to about 15 composition weight percent expanded perlite and from about 5 to about 10 composition weight percent expanded vermiculite.

14. The composition of matter of claim 13, wherein said lightweight aggregate comprises from about 17.4 to about 19.8 composition weight percent.

15. The composition of matter of claim 13, wherein each of said perlite and vermiculite comprises at least about 7.6 composition weight percent.

16. The composition of matter of claim 13, wherein said cement comprises from about 50 to about 65 composition weight percent calcium aluminate cement and said accelerator comprises from about 20 to about 30 composition weight percent plaster of Paris.

17. The composition of matter of claim 16, further comprising from about 0.5 to about 2.0 weight percent air entraining admixture, and from about 0.3 to about 1.5 weight percent surfactant.

18. The composition of matter of claim 13, wherein said cement comprises from about 30 to about 50 composition weight percent Portland cement and said accelerator comprises from about 20 to about 40 composition weight percent plaster of Paris and from about 4 to about 20 composition weight percent terra alba.

19. The composition of matter of claim 18, further comprising from about 0.5 to about 2.0 weight percent air entraining admixture, and from about 0.3 to about 1.5 weight percent surfactant.

20. A composition of matter suitable as a component of lightweight insulating concrete, comprising:
- about 4 parts by weight of a cemcntitious forming material, wherein said cementitious forming material comprises a hydraulic binder and accelerator combination selected from the group consisting of (i) a first combination comprising Portland cement, plaster of Paris and terra alba in weight ratios of about 5:4:1; and (ii) a second combination comprising calcium aluminate cement and plaster of Paris in a weight ratio of about 11:5;
- about 1 part by weight of a lightweight aggregate, wherein said lightweight aggregate comprises an expanded perlite fraction and an expanded vermiculite fraction, wherein a ratio by weight of said fractions does not exceed about 2:1;
- an air entraining admixture in an amount between about 0.5 and about 2.0 percent of the total weight, wherein said admixture is selected from the group consisting of neutralized vinsol resin and alpha olefin sulfonate; and
- a surfactant in an amount between about 0.3 and about 1.5 percent of the total weight, wherein said surfactant is selected from the group consisting of sulfonated melamine and napthalene formaldehyde.

21. The composition of matter of claim 20, wherein said fractions have a weight ratio that does not exceed about 4:3.

22. A method of making a composition stable for formimg lightweight insulating concrete, comprising the steps of:
- providing a first component comprising a cementitious forming material which further comprises Portland cement, plaster of Paris and terra alba in weight ratios of about 5:4:1; and
- blending said first component with a second component comprising a lightweight aggregate, said lightweight aggregate comprising an expanded vermiculite fraction and an opanded perlite fraction, wherein a weight ratio of either of said fractions to the other does not exceed about 2:1.

23. A method of making a composition suitable for forming lightweight insulating concrete, comprising the steps of:
- providing a first component comprising a cementitious forming material which further comprises calcium aluminate cement and plaster of Paris in a weight ratio of about 11:5; and
- blending said first component with a second component comprising a lightweight aggregate, said lightweight aggregate comprising an expanded vermicuite fraction and an expanded perlite fraction, wherein a weight ratio of either of said fractions to the other does not exceed about 2:1.

24. A method of making a composition suitable for forming lightweight insulating concrete, comprising the steps of:
- providing a first component comprising a cementitious forming material;
- blending said first component with a second component comprising a lightweight aggregate, said lightweight aggregate comprising an expanded vermiculite fraction and an expanded perlite fraction, wherein a weight ratio of either of said fractions to the other does not exceed about 2:1; and blending into the composition:
  an air entraining admixtue in an amount between about 0.5 and about 2.0 percent weight of the first and second components; and
  a surfactant in an amount between about 0.3 and about 1.5 percent weight of the first and second components.

25. A method of making a composition suitable for forming lightweight insulating concrete, comprising the step of:
  providing a first component comprising a cementitious forming material;
  blending about 30 to about 33 parts by weight of said first component with about 7 to about 8 parts by weight of a second component comprising a lightweight aggregate, said lightweight aggegate comprising an expanded perlite fraction and an expanded vermiculite fraction wherein each of said fractions is at least about 3 parts by weight of said about 7 to about 8 parts.

26. A method of repairing or patching a concrete surface comprising the steps of:
  preparing the composition of any of claims 1, 5, 11, 13 or 20;
  sufficiently hydrating the composition to create a slurry; and
  applying said slurry to said surface to create a patch.

27. The method of claim 26, wherein said patch cures to set from about 2 hours to about 4 hours after said slurry is applied.

28. A composition of matter suitable for forming a lightweight insulating concrete, comprising:
  a cementitious forming material comprising Portland cement, plaster of Paris, and terra alba, wherein the weight ratios of said Portland cement, plaster of Paris, and terra alba are about 5:4:1; and
  a lightweight aggregate;
  wherein the concrete foiined from the composition has a density after setting and oven-drying which is less than about 30 pounds per cubic foot.

29. A composition of matter suitable as a component of lightweight insulating concrete, comprising:
  about 4 parts by weight of a cementitious forming material, wherein said cementitious forming material comprises a hydraulic binder and accelerator combination selected from the group consisting of (i) a first combination comprising Portland cement, plaster of Paris and terra alba in weight ratios of about 5:4:1; and (ii) a second combination comprising calcium aluminate cement and plaster of Paris in a weight ratio of about 11:5;
  about 1 part by weight of a lightweight aggregate;
  an air entraining admixture in an amount between about 0.5 and about 2.0 percent of the total weight, wherein said admixture is selected from the group consisting of neutralized vinsol resin and alpha olefin sulfonate; and
  a surfactant in an amount between about 0.3 and about 1.5 percent of the total weight, wherein said surfactant is selected from the group consisting of sulfonated melamine and napthalene formaldehyde.

30. A method of making a composition suitable for forming lightweight insulating concrete, comprising the steps of:
  providing a first component comprising a cementitious forming material which further comprises Portland cement, plaster of Paris and terra alba in weight ratios of about 5:4:1; and
  blending said first component with a second component comprising a lightweight aggregate.

* * * * *